W. H. BRISTOL.
MEASURING APPARATUS.
APPLICATION FILED JUNE 22, 1917.

1,263,308.

Patented Apr. 16, 1918.

INVENTOR
William H. Bristol
BY
ATTORNEY

UNITED STATES PATENT OFFICE.

WILLIAM H. BRISTOL, OF WATERBURY, CONNECTICUT.

MEASURING APPARATUS.

1,263,308.  Specification of Letters Patent.  Patented Apr. 16, 1918.

Application filed June 22, 1917. Serial No. 176,282.

*To all whom it may concern:*

Be it known that I, WILLIAM H. BRISTOL, a citizen of the United States, and a resident of Waterbury, in the county of New Haven and State of Connecticut, have invented certain new and useful Improvements in Measuring Apparatus, of which the following is a specification.

The invention relates to improvements in measuring apparatus, more particularly to a measuring device provided with a single pointer or arm designed to operate over a chart or dial to produce a multiplicity of records of separate and distinct operations or physical or other conditions and changes. In multiple record instruments of this character, it has been difficult to individualize the different records or indications of the measuring pointer or arm which is arranged to be intermittently and successively actuated for each of the corresponding controlling conditions.

It is the object of the present invention to so restrict or localize the action of said measuring arm or pointer that the same will operate for each particular condition over the entire length or revolution of the chart (temperature line) but over a particular predetermined portion only of the measuring arc, corresponding to the working range or active measuring position.

A further object of the invention is to provide means whereby the movement of the arm or pointer may be adjusted to be suitable for operation over its original predetermined restricted radial portion or measuring arc of the chart, even though the controlling condition corresponding thereto be altered from the normal.

The nature of the invention will be best understood when described in connection with the accompanying drawings, which illustrate by way of example one embodiment of the invention, and in which—

Similar characters of reference designate corresponding parts throughout the several views.

Figure 1:
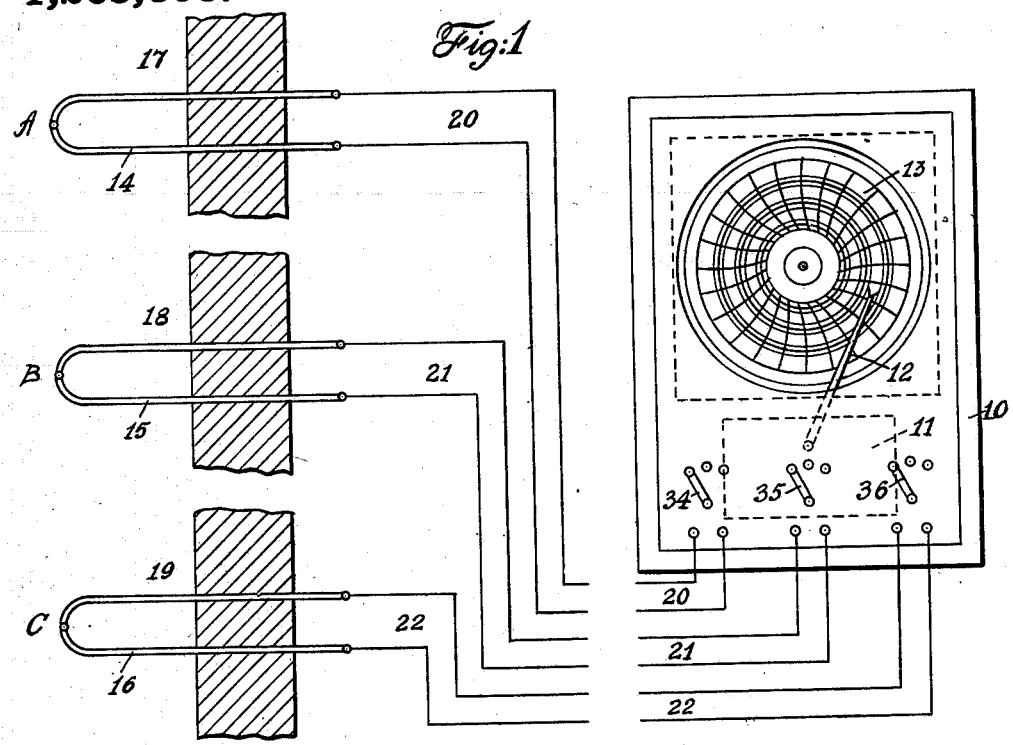
Figure 1 illustrates the invention as applied to the measurement of the temperatures of a plurality of furnaces.

Referring to the drawings, 10 designates a suitable casing containing a measuring instrument, for example, an electrically actuated movement 11 of any well-known or special construction, operating an arm or pointer 12 which may, if desired, effect a record of the indications upon a suitable chart, for example a rotatable chart 13, in well-known manner, and for all of which no claim is made *per se*. The instrument 11 is designed to be connected with the devices affected by the operations or conditions to be measured. For example, it may be connected with a plurality of thermo-electric couples 14, 15 and 16 located at various points and adapted to measure the temperatures of furnaces 17, 18 and 19, designated as stations A, B and C.

Under ordinary conditions, while each thermo-electric couple would properly actuate the arm 12 and provide a record of the temperature on chart 13, the various records thus made would be found, generally, to conflict and would be difficult to differentiate and read accurately. In fact, various expedients have been heretofore proposed to obviate the difficulty of separating the individual records thus made, for example, different characteristic markings have been made by the pointer to correspond with the changes at the different stations involved; or, the different records have been made over various portions of the length of the chart or in different sectors thereof.

Figure 3:
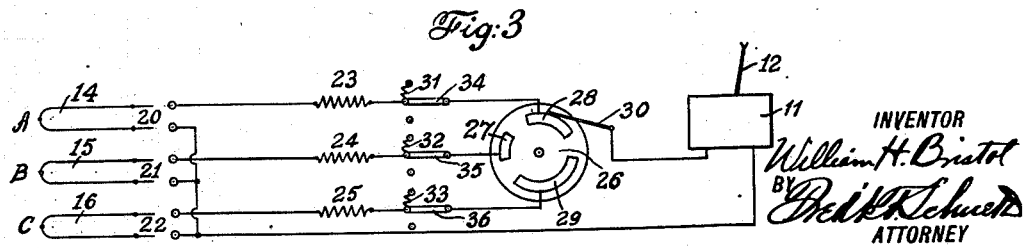
Fig. 3 is a diagrammatic view illustrating the electrical connections.

In accordance with the present invention, however, the actual locality of operation of the arm is restricted or individualized on the chart over the measuring arc; whereas, formerly, each of the thermo-electric couples would have effected a record of a particular temperature along the same temperature line of the chart for a given temperature. This is accomplished by inserting in each of the circuits 20, 21 and 22, leading from a thermo-electric couple to the measuring instrument, a suitable resistance 23, 24 and 25 (Fig. 3), whereby the indications of the measuring arm 12 will be localized and restricted to a particular predetermined portion of the chart 13 for a given predetermined range. For example, assuming that the device were adapted for the measurement of temperatures of 1000° C., for stations A and B, and 1500° C. for station C with a reasonable variation either side, the one circuit 22 for the outermost record or that of station C will contain a predetermined resistance to suit the particular position, the circuit 21 for the intermediate record, another resistance, and the circuit 20 for the innermost record, a still further resistance. Therefore, though each thermoelectric couple of stations A and B be exposed successively to the same temperature, to-wit—1000° C., and the station C to 1500° C., the corresponding positions of arm 12 with reference to the chart would be separated by definite intervals, from which a predetermined variation would be permissible without conflict of the different records and which are thus properly individualized.

In effecting a record, it is understood that the arm or pointer is to be connected first to one and then to the other thermo-electric couples in succession, being retained in one position of action for a sufficiently long period of time in each case to make a distinct and intelligible record 24'. The records may be further differentiated as hereinafter set forth. The arm is moved to a new position after each of the successive records; and the interval between the markings corresponding to a particular thermo-electric couple thus localized is not so great as to render the record unsatisfactory.

Figure 2:
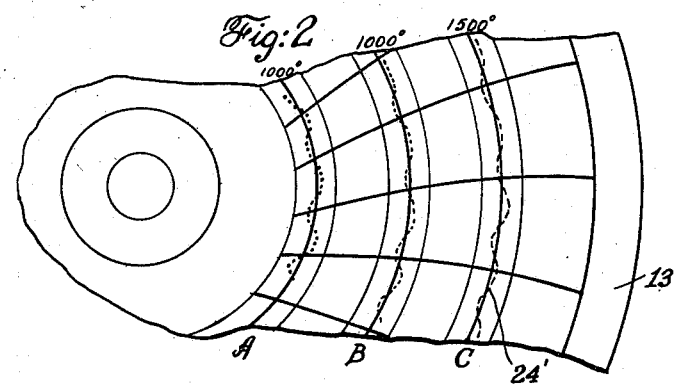
Fig. 2 is a fragmentary view illustrating a form of chart which may be employed.

To accomplish this change from one thermo couple to the other, any suitable and well-known contact device, as the device 26, driven by clock mechanism or otherwise, may be employed; and the same is provided with a plurality of contacts 27, 28 and 29 corresponding to the number of individualized records desired. These revolving contacts are connected respectively with a lead 20, 21 and 22 of each of the thermo-electric couples, the other leads therefrom being all connected to one pole of the measuring instrument 11, while the other pole of said instrument is connected to a brush 30 which bears successively upon the contact segments 27, 28 and 29 as the same are presented thereto, thus completing the circuit from a particular thermo-electric couple, and through the corresponding resistance thereof which localizes the record made. Moreover, by making the segments 27, 28 and 29 of different length, the characteristics of the records may be correspondingly altered (see Fig. 2).

It may be found desirable, furthermore, to employ the same couple already installed for measuring temperatures different from those for which the apparatus has been adjusted and record localized. For example, the temperature of a furnace at stations A or B might be raised to 1500° C. or at station C to 2000° C.; and in order to maintain the record for such temperature at the previously localized position on the chart, adjustable resistances 31, 32 and 33 are arranged to be cut into the corresponding circuits. In this manner, the decreased potential set up by the thermo-electric couple is changed in its effect so as to correspond to the position for the lower temperature, and a different scale may be provided to accommodate the change. In order to conveniently include or exclude a resistance, switches 34, 35 and 36 are provided preferably at the measuring instrument casing 10.

I claim:

1. An electrical measuring instrument having a single measuring arm; a plurality of actuating members adapted to be connected with said instrument; and resistances adapted to be connected in circuit with said actuating members for the purpose of localizing and individualizing the plurality of measurements made by the said arm through the instrumentality of the said actuating members.

2. An electrical measuring instrument having a single recording arm; a plurality of actuating members adapted to be connected with said instrument; and resistances adapted to be connected in circuit with said actuating members for the purpose of localizing and individualizing the plurality of records made by the said arm through the instrumentality of the said actuating members.

3. An electric measuring instrument having a single recording arm; a plurality of actuating members adapted to be connected with said instrument; a plurality of resistances adapted to be automatically and successively connected in circuit with said actuating members for the purpose of localizing and individualizing the plurality of records made by the said arm through the instrumentality of the said actuating members.

4. An electrical measuring instrument having a single recording arm; a plurality of actuating members adapted to be connected with said instrument; a plurality of resistances; and means to periodically connect a particular actuating member to said measuring instrument and simultaneously therewith include a predetermined resistance.

5. An electrical measuring instrument having a single recording arm; a plurality of actuating members adapted to be connected with said instrument; a plurality of resistances; and means to periodically connect a particular actuating member to said measuring instrument and simultaneously therewith include a predetermined resistance, each resistance being of a different value.

6. An electrical measuring instrument having a single recording arm; a plurality of actuating members adapted to be connected with said instrument; a plurality of resistances; and means to successively connect said actuating members to said measuring instrument and simultaneously therewith include a said resistance.

7. An electrical measuring instrument having a single measuring arm; a plurality of actuating members adapted to be connected with said instrument; resistances adapted individually to be connected in circuit with said actuating members for the purpose of localizing and individualizing the plurality of measurements made by the said arm through the instrumentality of the said actuating members; and additional resistances adapted individually to be connected in circuit with said first-named resistances and with said measuring instrument.

8. An electrical recording instrument having a single recording arm; a plurality of actuating members; a rotatable contact device adapted to successively connect said actuating members to said measuring instrument; and resistances adapted to be included in circuit with each of said actuating members through the instrumentality of said contact device to localize and individualize the respective records made by said recording arm.

9. An electrical recording instrument having a single recording arm; a plurality of actuating members; a rotatable contact device adapted to successively connect said actuating members to said measuring instrument; resistances adapted to be included in circuit with each of said actuating member through the instrumentality of said contact device to localize and individualize the respective records made by said recording arm; and means to include additional resistance in a circuit of an actuating member.

10. An electrical recording instrument having a single recording arm; a plurality of thermo electric couples; a rotatable contact device adapted to successively connect said thermo electric couples to said measuring instrument; and resistances adapted to be included in circuit with each of said thermo electric couples through the instrumentality of said contact device to localize and individualize the respective records made by said recording arm.

11. An electrical recording instrument having a single recording arm; a plurality of actuating members; a rotatable contact device, having a plurality of contact segments of different length, adapted to successively connect said actuating members to said measuring instrument; and resistances adapted to be included in circuit with each of said actuating members through the instrumentality of said contact device to localize and individualize the respective records made by said recording arm.

Signed at New York, in the county of New York and State of New York, this 19th day of June, A. D. 1917.

WILLIAM H. BRISTOL.